Oct. 24, 1944.　　　C. E. BASTON　　　2,361,168
LOCOMOTIVE CONTROL SYSTEM
Filed Nov. 19, 1942
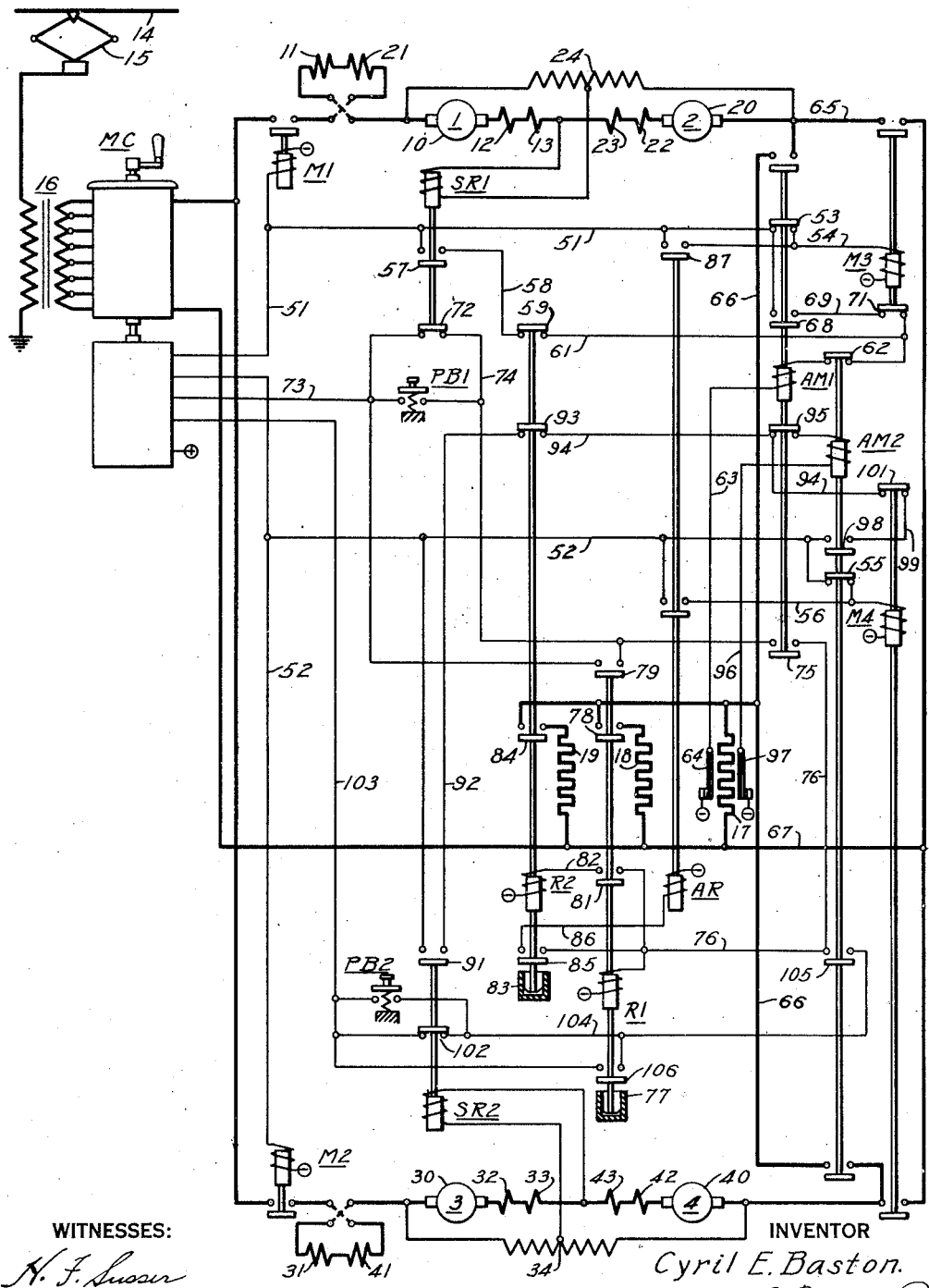
WITNESSES:　　　　　　　　　　　　　　　　INVENTOR
　　　　　　　　　　　　　　　　　　　　Cyril E. Baston.
　　　　　　　　　　　　　　　　　　　BY
　　　　　　　　　　　　　　　　　　　　ATTORNEY Patented Oct. 24, 1944

2,361,168

UNITED STATES PATENT OFFICE 2,361,168

LOCOMOTIVE CONTROL SYSTEM

Cyril E. Baston, Forest Hills, Pa., assignor to Westinghouse Electric & Manufacturing Company, East Pittsburgh, Pa., a corporation of Pennsylvania Application November 19, 1942, Serial No. 466,134

15 Claims. (Cl. 172—179)

My invention relates, generally, to control systems and, more particularly, to systems for controlling slippage of the driving wheels of electrically propelled locomotives and vehicles.

In recent years, the trend in locomotive design has been toward the use of traction motors of greater horsepower geared to each driving axle. Since the permissible axle loading is not unlimited there has been an increase of the adhesion at which the locomotive must operate. This results in a tendency of the drivers to slip when hauling their rated loads.

One method of attempting to control the slipping of the drivers is to notch the controller back manually when the slip occurs, thereby reducing the voltage on the motors and, consequently, the torque they exert until the wheels grip the rail and then advancing the controller to its original position. This method permits a considerable increase in the speed of the motor armature, thereby requiring a longer time to dissipate the energy and permit the wheel to grip the rail again. The effectiveness of this method depends upon the alertness of the operator, and slip relays have been provided for operating signal devices to call the operator's attention to the slipping condition. Even when the operator does take immediate action, he must reduce the tractive effort of all the traction motors to that of the slipping motors, and then when slipping has stopped, return the controller to its original position.

In the copending application of L. J. Hibbard Serial No. 466,138, filed November 19, 1942, provision is made for automatically inserting either resistance or reactance in the slipping motor circuit to reduce the voltage across the slipping motor, thereby stopping the slipping condition. An object of the present invention is to simplify and improve the system disclosed in the aforesaid copending application.

Another object of my invention is to automatically restore the voltage across the slipping motor to normal as soon as the slipping is stopped.

A further object of my invention is to provide for automatically increasing the voltage across the slipping motor in a plurality of successive increments after the slipping condition is corrected.

Other objects of my invention will be explained fully hereinafter or will be apparent to those skilled in the art.

In accordance with the present invention, a single resistor may be connected in the circuit for whichever of a plurality of motors is slipping, thereby reducing the voltage across only the circuit containing the slipping motor. When the slipping stops, the voltage is increased by successively connecting additional resistors in parallel-circuit relation to the first resistor. Finally, the motors are restored to normal operating conditions.

For a fuller understanding of the nature and objects of my invention, reference may be had to the following detailed description, taken in conjunction with the accompanying drawing, in which the single figure is a diagrammatic view of a control system embodying my invention.

Referring to the drawing, the system shown therein comprises a pair of traction motors 1 and 2 which are connected in series-circuit relation, and a similar pair of motors 3 and 4 also connected in series-circuit relation. The two groups of motors are connected in parallel-circuit relation across the power source, thereby forming the well known series-parallel arrangement commonly used on railway locomotives.

The motor 1 is provided with an armature winding 10, a main field winding 11, a compensating winding 12 and a commutating winding 13. The motor 2 is provided with an armature winding 20, a main field winding 21, a compensating winding 22, and a commutating winding 23. Likewise, the motor 3 is provided with an armature winding 30, a main field winding 31, a compensating winding 32, and a commutating winding 33. The motor 4 is provided with an armature winding 40, a main field winding 41, a compensating winding 42 and a commutating winding 43. Disconnecting switches M1, M2, M3 and M4 are provided for disconnecting either group of motors from the power source.

The motors may be energized from a trolley conductor 14 through a current collector 15 and a power transformer 16. In accordance with the usual practice, the voltage applied to the motors may be controlled by means of a master controller MC which may be utilized to connect the motors to successive taps on the secondary winding of the transformer 16. The motors may be connected to the transformer taps either directly through the master controller or as is the usual practice, tap-changing switches (not shown) may be provided for making the transformer connections and the operation of the tap-changing switches may be controlled by means of the master controller. The operation of the switches M1, M2, M3 and M4 may also be controlled by means of the controller MC.

As explained hereinbefore, it has been found necessary to provide some means for controlling the slipping of the axles driven by the motors when two or more motors are connected in series-circuit relation. When one axle starts slipping, the voltage of the motor which drives that axle increases, thereby robbing voltage from the other motor which is connected in series with the slipping motor, and if the slipping is not controlled, the action becomes cumulative and the slipping motor may attain a dangerous speed.

In order to control the slipping action, the voltage across the circuit containing the slipping motor is instantly reduced by connecting a resistor 17 in the circuit for the slipping motor, thereby reducing the voltage on the slipping motor and stopping the slipping condition. As soon as the slipping is arrested, the voltage is restored to normal without affecting the other motor circuits on the locomotive. The voltage is returned to normal in a plurality of steps by successively connecting additional resistors 18 and 19 in parallel-circuit relation to the resistor 17, thereby reducing the total resistance in the circuit containing the slipping motor. Finally, the motor connections are returned to normal, thereby applying the same voltage on the motors as was applied prior to the slipping condition.

In order to simplify the system and reduce the amount of equipment required, provision is made for connecting the resistors 17, 18 and 19 in the circuit for either the motors 1 and 2 or the motors 3 and 4, depending upon which motor is slipping. Thus, one set of resistors is utilized for reducing the voltage on the circuit for either group of motors. Furthermore, the circuit connections are such that the voltage is reduced on only the circuit containing the slipping motor, thereby permitting the remaining motors to exert their full tractive effort.

In addition to the switches M1, M2, M3 and M4, switches AM1, AM2, R1, R2 and AR are provided for performing the necessary switching operations for first connecting the resistor 17 in the circuit containing the slipping motor, and then connecting the resistors 18 and 19 in parallel-circuit relation to the resistor 17 in successive steps after the slipping condition is corrected. As shown, the switches R1 and R2 may be provided with time delay devices for delaying the closing of the contact members of these switches for a predetermined time interval after the energization of the actuating coils for the switches. In this manner, a predetermined time interval between the operation of each switch and the next succeeding switch may be obtained, thereby preventing a tendency to cause a reoccurrence of the slipping condition by increasing the voltage on the motors too rapidly.

The operation of the switches which are utilized for correcting the slipping condition may be controlled by slip relays SR1 and SR2. The actuating coil of the relay SR1 is connected across the midpoint between the motors 1 and 2 and the midpoint of a reactor 24. The reactor 24 is so connected across the terminals of the series-connected motors 1 and 2 that the relay SR1 is responsive to any unbalance in the motor voltages and is, therefore, responsive to an unbalance in their speeds. The actuating coil of the relay SR2 is connected across the midpoint between the motors 3 and 4 and the midpoint of a reactor 34. The reactor 34 is so connected across the motors 3 and 4 that the relay SR2 is responsive to an unbalance in the motor voltages and consequently, an unbalance in their speeds.

The contact members of the relay SR1 and SR2 are so connected in the control system that the proper switches are operated for correcting a slipping condition of any one of the motors and then restoring the circuit for the slipping motor to normal conditions after the slipping condition is corrected. Push-button switches PB1 and PB2 are provided to enable the operator of the locomotive to restore the motor circuits to normal condition prior to the automatic restoration which is under the control of the slip relays SR1 and SR2.

In order that the functioning of the foregoing apparatus may be more clearly understood, the operation of the system will now be described in more detail. During normal operation of the locomotive, the switches M1, M2, M3 and M4 are closed, their actuating coils being energized through circuits established by the master controller MC. Thus, the actuating coil of the switch M1 is energized through a circuit which extends from positive at the controller MC through conductor 51 and the actuating coil of the switch M1 to negative. Likewise, the actuating coil of the switch M2 is energized from positive at the controller MC through conductor 52 and the coil of the switch M2 to negative. The energizing circuit for the actuating coil of the switch M3 extends from the conductor 51 through an interlock 53 on the switch AM1, conductor 54 and the actuating coil of the switch M3 to negative. The energizing circuit for the actuating coil of the switch M4 extends from the conductor 53 through an interlock 55 on the switch AM2, conductor 56 and the actuating coil of the switch M4 to negative.

Assuming that either the motor 1 or 2 slips, the relay SR1 is operated as a result of the unbalance in the motor voltages, and the switch AM1 is closed to connect the resistor 17 across the contact members of the switch M3. Following the closing of the switch AM1, the switch M3 is opened, thereby connecting the resistor 17 in series-circuit relation with the motors 1 and 2 to reduce the voltage applied these motors which, as explained hereinbefore, corrects the slipping condition. The energizing circuit for the actuating coil of the switch AM1 may be traced from the conductor 51 through contact members 57 of the relay SR1, conductor 58, an interlock 59 on the switch R2, conductor 61, an interlock 62 on the switch AM2, the actuating coil of the switch AM1, conductor 63 and the contact members of a thermally responsive device 64 to negative.

Closing the switch AM1 connects the resistor 17 across the contact members of the switch M3 through a circuit which may be traced from one terminal of the switch M3, through conductor 65, the contact members of the switch AM1, conductor 66, the resistor 17, and conductor 67 to the other terminal of the switch M3. As explained hereinbefore, the closing of the switch AM1 causes the opening of the switch M3 since the actuating coil of the switch M3 is deenergized by the opening of the interlock 53 carried by the switch AM1. The opening of the switch M3 inserts the resistor 17 in series-circuit relation with the motors 1 and 2, thereby reducing the voltage applied to these motors.

Following the opening of the switch M3, a holding circuit is established for the switch AM1. This circuit may be traced from the conductor 51 through an interlock 68 on the switch AM1, conductor 69, an interlock 71 on the switch M3, the conductor 61, the interlock 62 on the switch AM2, the actuating coil of the switch AM1, conductor 63 and the contact members of the thermally responsive device 64 to negative. In this manner, the switch AM1 is held closed until the slipping condition is corrected unless the resistor 17 becomes overheated, in which case the thermally responsive device 64 opens its contact members to deenergize the actuating coil of the switch AM1, thereby permitting this switch to open.

When the slipping condition is corrected, the relay SR1 is deenergized since there will no longer be an unbalance in the voltage of the motors 1 and 2. Accordingly, the contact members 72 of the relay SR1 are closed to energize the actuating coil for the switch R1 through a circuit which may be traced from the controller MC through conductor 73, contact members 72 of the relay SR1, conductor 74, an interlock 75 on the switch AM1, conductor 76, and the actuating coil of the switch R1 to the negative. As explained hereinbefore, the switch R1 is provided with a time delay device 77 which delays the closing of the contact members of the switch R1 for a predetermined time interval after the energization of its actuating coil.

When the switch R1 is closed, the resistor 18 is connected in parallel-circuit relation to the resistor 17 by means of contact members 78 on the switch R1. In this manner, the effective resistance in the circuit for the motors 1 and 2 is reduced, thereby increasing the voltage supplied to the motors. A holding circuit for the switch R1 is established through an interlock 79, carried by the switch R1. The interlock 79 parallels the contact members 72 of the slip relay SR1. Accordingly, the switch R1 will remain closed and the switch R2 will be closed in the manner hereinafter described, even though the slipping condition should reoccur, thereby causing the slip relay SR1 to open its contact members 72. Thus, the sequence of operation of the switches necessary to restore normal voltage on the motors is completed once it is started by the closing of the contact members 72 of the relay SR1. If the motors are slipping when normal voltage is reapplied, the relay SR1 will operate to reconnect the resistor 17 in the motor circuit, thereby repeating the sequence of operation necessary to stop the slipping condition.

Following the closing of the switch R1, the actuating coil of the switch R2 is energized through a circuit which extends from the conductor 76 through an interlock 81 on the switch R1, conductor 82, and the actuating coil of the switch R2 to negative. The switch R2 is provided with a time-delay device 83 which delays the closing of the contact members of the switch. After a predetermined time interval, the contact members 84 of the switch R2 are closed to connect the resistor 19 in parallel-circuit relation to the resistor 18 and 17, thereby further decreasing the effective resistance in the motor circuit and increasing the voltage applied to the motors.

Following the closing of the switch R2, the actuating coil of the switch AR is energized through a circuit which extends from the conductor 76 through an interlock 85 on the switch R2, conductor 86 and the actuating coil of the switch AR to negative. The closing of the switch AR establishes an energizing circuit for the actuating coil of the switch M3, thereby reclosing the switch M3 to connect the motors 1 and 2 directly across the power source and applying normal voltage to the motors. The circuit for the actuating coil of the switch M3 may be traced from the conductor 51 through contact members 87 on the switch AR, conductor 54 and the coil of the switch M3 to negative.

The closing of the switch M3 interrupts the holding circuit for the coil of the switch AM1 by the opening of the interlock 71 carried by the switch M3. Thus, the switch AM1 is opened to disconnect the resistors 17, 18 and 19 from the motor circuit. Following the opening of the switch AM1, the switches R1, R2 and AR are opened as a result of the opening of the interlock 75 carried by the switch AM1. In this manner, all of the switches are returned to their normal positions and stand ready for a repetition of the foregoing cycle of operation upon the reoccurrence of a slipping condition of either of the motors 1 or 2.

As explained hereinbefore, the push-button switch PB1, the contact members of which parallel the contact members 72 of the slip relay SR1, may be utilized by the operator of the locomotive to close the switches R1, R2 and AR to reapply normal voltage to the motors prior to the automatic restoration of normal voltage by the operation of the relay SR1, as hereinbefore described.

In the event of slippage of either motor 3 or 4, the relay SR2 operates to close the switch AM2 and open the switch M4, thereby connecting the resistor 17 in series-circuit relation with the motors 3 and 4 in a manner similar to that hereinbefore described for a slipping condition in either motor 1 or 2. The energizing circuit for the actuating coil of the switch AM2 may be traced from the conductor 52 through contact members 91 of the relay SR2, conductor 92, an interlock 93 on the switch R2, conductor 94, an interlock 95 on the switch AM1, the actuating coil of the switch AM2, conductor 96 and the contact members of a thermally responsive device 97 to negative. The closing of the switch AM2 opens the switch M4 as a result of the opening of the interlock 55 carried by the switch AM2. Following the opening of the switch M4, a holding circuit is established for the coil of the switch AM2, which may be traced from the conductor 52 through an interlock 98 on the switch AM2, conductor 99, an interlock 101 on the switch M4, conductor 94, the interlock 95 on the switch AM1, the actuating coil of the switch AM2, conductor 96 and the thermally responsive device 97 to negative.

After the slipping condition is corrected, the relay SR2 closes its contact members 102 to energize the actuating coil of the switch R1 thereby closing the switch R1 to connect the resistor 18 in parallel-circuit relation to the resistor 17 in a manner similar to that hereinbefore described. The energizing circuit for the coil of the switch R1 may be traced from the controller MC through conductor 103, contact members 102 of the relay SR2, conductor 104, an interlock 105 on the switch AM2, conductor 76, and the actuating coil of the switch R1 to negative. Following the closing of the switch R1, a holding circuit for the actuating coil of this switch is established through an interlock 106 carried by the switch R1. The interlock 106 parallels the contact members 102 of the relay SR2. In this manner, the sequence of operation of the switches R1, R2 and AR is carried through in the manner hereinbefore described and normal voltage is reapplied to the motors after the slipping condition is corrected.

From the foregoing description, it is apparent that I have provided a control system which automatically reduces the voltage on the circuit containing the slipping motor almost instantaneously upon the occurrence of the slipping condition. Furthermore, the voltage is reduced only in the circuit containing the slipping motor, thereby permitting the remaining motors to exert their full tractive effort to drive the locomotive. Normal voltage is automatically restored on the motors as soon as the slipping condition is corrected, thereby restoring the motors to normal operating conditions with a minimum loss of speed because of the slipping condition.

The present system is fully automatic in operation and is independent of the position of the master controller. A minimum amount of equipment is required since a single set of resistors, and the necessary switches for connecting these resistors in the motor circuits, are utilized for both groups of motors.

Since many modifications may be made in the apparatus and arrangement of parts without departing from the spirit of my invention, I do not wish to be limited other than by the scope of the appended claims.

I claim as my invention:

1. In a control system, in combination, a plurality of electric motors connected in series-circuit relation, switching means for inserting voltage reducing means in the motor circuit, relay means responsive to an unbalance in the motor voltages for controlling the operation of said switching means, and interlocking means actuated by said switching means and cooperating with said relay means to increase the motor voltage.

2. In a control system, in combination, a plurality of electric motors connected in series-circuit relation, means for reducing the voltage impressed on the motors, switching means for inserting said voltage reducing means in the motor circuit, relay means responsive to an unbalance in the motor speeds for controlling the operation of said switching means, and interlocking means on said switching means and cooperating with said relay means to increase the motor voltage.

3. In a control system, in combination, a plurality of electric motors connected in series-circuit relation, means for reducing the voltage impressed on the motors, switching means for inserting said voltage reducing means in the motor circuit, relay means responsive to an unbalance in the motor speeds for controlling the operation of said switching means, and interlocking means on said switching means and cooperating with said relay means to increase the motor voltage in a plurality of successive steps.

4. In a control system, in combination, a plurality of electric motors connected in series-circuit relation, means for reducing the voltage impressed on the motors, switching means for inserting said voltage reducing means in the motor circuit, relay means responsive to an unbalance in the motor speeds for controlling the operation of said switching means, and interlocking means on said switching means and cooperating with said relay means in removing said voltage reducing means from the motor circuit.

5. In a control system, in combination, a plurality of electric motors connected in series-circuit relation, means for reducing the voltage impressed on the motors, switching means for inserting said voltage reducing means in the motor circuit, relay means responsive to an unbalance in the motor speeds for controlling the operation of said switching means, and interlocking means on said switching means and cooperating with said relay means in removing said voltage reducing means from the motor circuit in a plurality of successive steps.

6. In a control system, in combination, a plurality of electric motors connected in series-circuit relation, a resistor for reducing the voltage impressed on the motors, switching means for connecting the resistor in the motor circuit, relay means responsive to an unbalance in the motor voltages for controlling the operation of the switching means, and means actuated by the switching means and cooperating with said relay means to disconnect said resistor from the motor circuit.

7. In a control system, in combination, a plurality of electric motors connected in series-circuit relation, a resistor for reducing the voltage impressed on the motors, switching means for connecting the resistor in the motor circuit, relay means responsive to an unbalance in the motor voltages for controlling the operation of the switching means, a plurality of additional resistors, and additional switching means for connecting said additional resistors in parallel-circuit relation to the first-named resistor.

8. In a control system, in combination, a plurality of electric motors connected in series-circuit relation, a resistor for reducing the voltage impressed on the motors, switching means for connecting the resistor in the motor circuit, relay means responsive to an unbalance in the motor voltages for controlling the operation of the switching means, a plurality of additional resistors, and additional switching means for connecting said additional resistors in parallel-circuit relation to the first-named resistor, the operation of said additional switching means being also controlled by said relay means.

9. In a control system, in combination, a plurality of electric motors connected in series-circuit relation, a resistor for reducing the voltage impressed on the motors, switching means for connecting the resistor in the motor circuit, relay means responsive to an unbalance in the motor voltages for controlling the operation of the switching means, a plurality of additional resistors, additional switching means for connecting said additional resistors in parallel-circuit relation to the first-named resistor, and interlocking means on said switching means and cooperating with said relay means to control the operation of said additional switching means.

10. In a control system, in combination, a plurality of electric motors connected in series-circuit relation, a resistor for reducing the voltage impressed on the motors, switching means for connecting the resistor in the motor circuit, relay means responsive to an unbalance in the motor voltages for controlling the operation of the switching means, a plurality of additional resistors, additional switching means for connecting said additional resistors in parallel-circuit relation to the first-named resistor interlocking means on said switching means and cooperating with said relay means to start the operation of said additional switching means, and interlocking means on the additional switching means for causing sequential operation of said additional switching means.

11. In a control system, in combination, a plurality of electric motors, switching means for connecting the motors in series-parallel circuit relation, means common to all groups of series-connected motors for reducing the voltage impressed on one group of series-connected motors relative to another group of series-connected motors, switching means for connecting said voltage reducing means in the circuit for any group of motors, relay means responsive to an unbalance in the motor voltages for controlling the operation of said switching means, and means actuated by said switching means and cooperating with said relay means to increase the motor voltage.

12. In a control system, in combination, a plurality of electric motors, switching means for connecting the motors in series-parallel circuit relation, means for reducing the voltage impressed on one group of series-connected motors relative to another group of series-connected motors, switching means for connecting said voltage reducing means in the circuit for any group of motors, relay means responsive to an unbalance in the motor voltages for controlling the operation of said switching means, and means actuated by said switching means and cooperating with said relay means to remove said voltage reducing means from the motor circuit.

13. In a control system, in combination, a plurality of electric motors, switching means for connecting the motors in series-parallel circuit relation, means for reducing the voltage impressed on one group of series-connected motors relative to another group of series-connected motors, switching means for connecting said voltage reducing means in the circuit for a selected group of motors, relay means responsive to an unbalance in the motor voltages for selecting and controlling the operation of said switching means, and means actuated by said switching means and cooperating with said relay means to increase the voltage on the selected group of motors.

14. In a control system, in combination, a plurality of electric motors, switching means for connecting the motors in series-parallel circuit relation, a resistor for reducing the voltage impressed on one group of series-connected motors relative to another group of series-connected motors, switching means for connecting said resistor in the circuit for a selected group of motors, relay means responsive to an unbalance in the motor voltages for selecting and controlling the operation of said switching means, and interlocking means on said switching means and cooperating with said relay means to disconnect said resistor from the motor circuit.

15. In a control system, in combination, a plurality of electric motors, switching means for connecting the motors in series-parallel circuit relation, a resistor for reducing the voltage impressed on one group of series-connected motors relative to another group of series-connected motors, switching means for connecting said resistor in the circuit for a selected group of motors, relay means responsive to an unbalance in the motor voltages for selecting and controlling the operation of said switching means, a plurality of additional resistors, additional switching means for connecting said additional resistors in parallel-circuit relation to the first-named resistor, and interlocking means on said switching means and cooperating with said relay means to control the operation of said additional switching means.

CYRIL E. BASTON.